United States Patent
Lowell et al.

(10) Patent No.: US 6,464,056 B1
(45) Date of Patent: Oct. 15, 2002

(54) ELECTRONICALLY CONTROLLED HYDRAULIC COUPLING

(75) Inventors: Jeffrey Lowell, Ventura; Brian D. Macy, Santa Ynez; Joseph Treiber, Santa Barbara, all of CA (US)

(73) Assignee: McLaren Automotive Group, Inc., Livonia, MI (US)

( * ) Notice: Subject to any disclaimer, the term of this patent is extended or adjusted under 35 U.S.C. 154(b) by 0 days.

(21) Appl. No.: 09/632,548

(22) Filed: Aug. 4, 2000

Related U.S. Application Data (60) Provisional application No. 60/147,563, filed on Aug. 6, 1999.

(51) Int. Cl.[7] ............................................. B60K 17/348
(52) U.S. Cl. ...................... 192/35; 192/103 F; 475/88
(58) Field of Search .............................. 192/35, 103 F, 192/85 AA; 180/249; 475/88

(56) References Cited

U.S. PATENT DOCUMENTS

| | | |
|---|---|---|
| 1,660,588 A | 1/1928 | Wishart et al. |
| 2,004,929 A | 6/1935 | Centervall |
| 2,026,777 A | 1/1936 | Dumble |
| 2,775,141 A | 12/1956 | Ronning |
| 2,899,981 A | 8/1959 | Binks |
| 2,913,928 A | 11/1959 | Double |
| 2,922,319 A | 1/1960 | Burner |
| 3,229,550 A | 1/1966 | Nickell |
| 3,230,795 A | 1/1966 | Mueller |
| 3,251,244 A | 5/1966 | Nickell |
| 3,350,961 A | 11/1967 | Dodge |
| 3,361,008 A | 1/1968 | Fallon |
| 3,393,582 A | 7/1968 | Mueller |
| 3,407,599 A | 10/1968 | Ulbricht |
| 3,490,312 A | 1/1970 | Seitz et al. |
| 3,686,976 A | 8/1972 | Philippi |
| 3,724,289 A | 4/1973 | Kennicutt |
| 3,748,928 A | 7/1973 | Shiber |
| 3,752,280 A | 8/1973 | Cheek |
| 3,835,730 A | 9/1974 | Pemberton |
| 3,894,446 A | 7/1975 | Snoy et al. |
| 3,923,113 A | 12/1975 | Pagdin |
| 3,987,689 A | 10/1976 | Engle |
| 4,012,968 A | 3/1977 | Kelbel |
| 4,031,917 A | 6/1977 | De John et al. |

(List continued on next page.)

FOREIGN PATENT DOCUMENTS

| | | | |
|---|---|---|---|
| GB | 2038429 | | 11/1982 |
| JP | 62-173332 | * | 7/1987 |
| JP | 4-107328 | * | 4/1992 |

*Primary Examiner*—Rodney H. Bonck
(74) *Attorney, Agent, or Firm*—Bliss McGlynn, P.C.

(57) ABSTRACT

A hydraulic coupling for use in a vehicle drivetrain includes a housing and a pair of rotary members projecting therefrom. The hydraulic coupling also includes a hydraulic circuit defining a low-pressure portion wherein the hydraulic fluid is at a first, lower pressure and a high-pressure portion wherein the hydraulic fluid is in a second, elevated pressure relative to the first pressure. A hydraulic pump is operatively supported within the housing and located within the path of the hydraulic circuit between the low pressure and high-pressure portions. The hydraulic pump is operable to pump hydraulic fluid from the low-pressure portion to the high-pressure portion of the hydraulic circuit. In addition, a clutch is supported within the housing and located within the high-pressure portion of the hydraulic circuit. The clutch is actuable by hydraulic fluid that is pumped by the hydraulic pump at the second, elevated pressure to couple the pair of rotary members together. Furthermore, the hydraulic coupling of the present invention includes a control valve that is operable in response to a signal from a controller to selectively control the actuation of the clutch independent of the fluid pressure in the high-pressure portion of the hydraulic circuit.

10 Claims, 5 Drawing Sheets

U.S. PATENT DOCUMENTS

| | | | | |
|---|---|---|---|---|
| 4,041,804 | A | 8/1977 | Clark | |
| 4,091,901 | A | 5/1978 | F'Geppert | |
| 4,177,831 | A | 12/1979 | Benjamin | |
| 4,253,491 | A | 3/1981 | Worthen et al. | |
| 4,258,588 | A | 3/1981 | Yum | |
| 4,263,824 | A | 4/1981 | Mueller | |
| 4,272,993 | A | 6/1981 | Kopich | |
| 4,388,196 | A | 6/1983 | Lucia | |
| 4,445,400 | A | 5/1984 | Sullivan et al. | |
| 4,493,387 | A | 1/1985 | Lake et al. | |
| 4,548,096 | A | 10/1985 | Giocastro et al. | |
| 4,601,359 | A | 7/1986 | Weismann et al. | |
| 4,606,428 | A | 8/1986 | Giere | |
| 4,630,505 | A | 12/1986 | Williamson | |
| 4,644,822 | A | 2/1987 | Batchelor | |
| 4,650,028 | A | 3/1987 | Eastman et al. | |
| 4,679,463 | A | 7/1987 | Ozaki et al. | |
| 4,714,129 | A | 12/1987 | Mueller | |
| 4,719,998 | A | 1/1988 | Hiramatsu et al. | |
| 4,727,966 | A | 3/1988 | Hiramatsu et al. | |
| 4,730,514 | A | 3/1988 | Shikata et al. | |
| 4,732,052 | A | 3/1988 | Dewald | |
| 4,821,604 | A | 4/1989 | Asano | |
| 4,867,012 | A | 9/1989 | McGarraugh | |
| 4,876,921 | A | 10/1989 | Yasui et al. | |
| 4,884,470 | A | 12/1989 | Onoue | |
| 4,905,808 | A | 3/1990 | Tomita et al. | |
| 4,909,371 | A | 3/1990 | Okamoto et al. | |
| 4,919,006 | A | 4/1990 | Willett et al. | |
| 4,924,989 | A | 5/1990 | Filderman | |
| 4,957,473 | A | 9/1990 | Takemura et al. | |
| 4,960,011 | A | 10/1990 | Asano | |
| 4,966,268 | A | 10/1990 | Asano et al. | |
| 4,974,471 | A | 12/1990 | McGarraugh | |
| 5,005,131 | A | 4/1991 | Imaseki et al. | |
| 5,087,228 | A | 2/1992 | Johansson | |
| 5,189,930 | A | 3/1993 | Kameda | |
| 5,197,583 | A * | 3/1993 | Sakai et al. | 192/35 |
| 5,213,125 | A | 5/1993 | Leu | |
| 5,299,986 | A | 4/1994 | Fabris et al. | |
| 5,310,388 | A | 5/1994 | Okcuoglu et al. | |
| 5,320,586 | A | 6/1994 | Baxter, Jr. | |
| 5,358,455 | A | 10/1994 | Lundstrom | |
| 5,536,215 | A | 7/1996 | Shaffer et al. | |
| 5,595,214 | A | 1/1997 | Shaffer et al. | |
| 5,611,746 | A | 3/1997 | Shaffer | |
| 5,702,319 | A | 12/1997 | Baxter, Jr. | |
| 5,735,764 | A | 4/1998 | Shaffer et al. | |
| 5,749,801 | A * | 5/1998 | Teraoka et al. | 475/88 |
| 5,827,145 | A | 10/1998 | Okcuoglu | |
| 5,888,163 | A | 3/1999 | Shaffer et al. | |
| 5,938,556 | A | 8/1999 | Lowell | |
| 5,941,788 | A | 8/1999 | Shaffer et al. | |
| 5,964,126 | A | 10/1999 | Okcuoglu | |
| 5,967,285 | A * | 10/1999 | Mohan et al. | 192/103 F |
| 6,056,658 | A | 5/2000 | Illmeier | |
| 6,112,874 | A * | 9/2000 | Kopp et al. | 192/85 AA |
| 6,145,644 | A * | 11/2000 | Mohan et al. | 192/103 F |
| 6,155,947 | A | 12/2000 | Lowell | |
| 6,168,545 | B1 | 1/2001 | Lowell | |
| 6,176,800 | B1 | 1/2001 | Shaffer et al. | |
| 6,216,841 | B1 * | 4/2001 | Hofer | 192/103 F |

* cited by examiner

ELECTRONICALLY CONTROLLED HYDRAULIC COUPLING

This application claims the benefit of U.S. provisional patent application entitled "Electronically Controlled Differential in a Traction Control System," having serial No. 60/147,563, and filed on Aug. 6, 1999.

BACKGROUND OF THE INVENTION

1. Field of the Invention

The present invention relates to hydraulic couplings for use with vehicle drivetrains within a housing thereof containing hydraulic fluid to rotatably couple a pair of rotary members about a rotational axis. More specifically, the present invention relates to such a hydraulic coupling that is electronically controlled.

2. Description of the Related Art

Hydraulic couplings are known in the related art for use with vehicle drivetrains within a housing thereof containing hydraulic fluid to rotatably couple a pair of rotary members about a rotational axis. Hydraulic couplings of this type typically include a casing having a generally hollow construction that is rotatable about an axis extending through the housing. A hydraulic pump is operatively supported within the casing about the rotational axis. One type of hydraulic pump that may be employed for this purpose includes a toothed impeller rotatably connected to one of the rotary members and having external teeth. The hydraulic pump also includes an outer pump element mounted to the casing for rotation eccentrically with respect to the toothed impeller. The outer pump element includes internal teeth of a number one more than the impeller teeth and in meshing relationship therewith to provide a pumping action upon relative rotation between the casing and the toothed impeller as the pair of rotary members rotate relative to each other. An inlet port is provided to the pump through which hydraulic fluid is delivered from a sump formed in the housing to the casing via the hydraulic pump. The hydraulic coupling further includes at least one clutch assembly that is employed to couple the rotary members. The clutch assembly typically includes a piston that is movably supported within a piston chamber formed within the casing. Pressurized, hydraulic fluid is delivered to the piston chamber and acts against the piston to engage a clutch pack thereby coupling the two rotary members to each other. To this end, the casing may include a transfer port through which pressurized hydraulic fluid is pumped from the hydraulic pump to the piston chamber. In addition, the casing may also include at least one outlet port through which pressurized hydraulic fluid flows from the piston chamber and is ultimately delivered back to the sump in the housing. Hydraulic couplings of the type described above and known in the related art may further include a self-actuating pressure or temperature responsive control valve that automatically opens and closes the outlet port in response to the pressure and/or temperature of the hydraulic fluid in the piston chamber thereby engaging or disengaging the clutch and couple or decouple the pair of rotary members, respectively.

Examples of hydraulic couplings of the type described above for use with front and rear differentials as well as transfer cases can be found in U.S. Pat. Nos. 5,310,388 issued to Okcuoglu et al.; 5,536,215 issued to Schaffer et al.; 5,595,214 issued to Schaffer et al.; 5,735,764 issued to Schaffer et al.; and 5,888,163 issued to Schaffer et al. Each of these patents are assigned to the assignee of the present invention. Furthermore, the disclosures of each of these patents are expressly incorporated herein by reference.

While the hydraulic couplings having self-actuating pressure or temperature esponsive outlet port control valves of the type referenced above have performed well in the past, there remains a need in the art for a hydraulic coupling which may be selectively actuated in an "on demand" mode to couple the rotating members as a function of parameters which may be independent of the pressure acting against the piston in the piston chamber. For example, in certain circumstances, vehicle driving conditions may dictate that the rotary members are preferably coupled at all times and without regard to the differential rotation of the axle half-shafts. Such circumstances may include vehicles that are driving in extreme off road conditions where it is desirable to have the axle half-shafts locked together.

On the other hand, circumstances may dictate that the rotating axle half-shafts are uncoupled without regard to any differential rotation of the axle half-shafts. Such circumstances may include vehicles that are operating in extreme cold weather conditions. Still further, it may also be desirable to regulate the amount of slip of the hydraulic coupling as a function of vehicle drivetrain parameters that are independent of the pressure generated by the hydraulic pump due to the differential rotation of the rotating axle half-shafts. Such parameters may include one or more of the yaw rate, vehicle speed, differential fluid temperature, differential axle speeds between the axle half-shafts or torque, etc.

Although there are a number of driving conditions that may benefit from the selective "on demand" and/or "automatic control" of the limited slip function of the hydraulic coupling, another example may include the use of a mini spare tire for emergency purposes. Since such spare tires have a relatively small diameter, continuous operation of the vehicle with traction wheels of a different effective diameter results in undesirable speed differences over extended periods of time. However, those having ordinary skill in the art will appreciate that there are many possible driving circumstances that would be improved by a hydraulic coupling having a limited slip capabilities that are actuable independent of the pressure generated by the hydraulic pump.

Thus, there remains a need in the art for a hydraulic coupling for use with vehicle drivetrains wherein the couplings have "on demand", "system off" and "automatic" limited slip operational modes.

SUMMARY OF THE INVENTION AND ADVANTAGES

The present invention overcomes the deficiencies in the related art in a hydraulic coupling for use in a vehicle drivetrain including a housing and a pair of rotary members projecting therefrom. The hydraulic coupling includes a hydraulic circuit defining a low-pressure portion wherein the hydraulic fluid is at a first, lower pressure and a high-pressure portion wherein the hydraulic fluid is in a second, elevated pressure relative to the first pressure. A hydraulic pump is operatively supported within the housing and located within the path of the hydraulic circuit between the low pressure and high-pressure portions. The hydraulic pump is operable to pump hydraulic fluid from the low-pressure portion to the high-pressure portion of the hydraulic circuit. In addition, a clutch is supported within the housing and located within the high-pressure portion of the hydraulic circuit. The clutch is actuable by hydraulic fluid that is pumped by the hydraulic pump at the second, elevated pressure to couple the pair of rotary members together. Furthermore, the hydraulic coupling of the present invention includes a control valve that is operable in response to a signal from a controller to selectively control the actuation of the clutch independent of the fluid pressure in the high-pressure portion of the hydraulic circuit.

Accordingly, one advantage of the hydraulic coupling of the present invention is its ability to operate in a "on demand" mode, a selective or "automatic control" mode or a "system off" mode wherein each of these operational modes are transparent to the vehicle operator. Furthermore, because the control valve is electrically actuated, the hydraulic coupling of the present invention permits operation that approaches open differential with minimal cross-axle torque transfer. Thus, it may be operated independently for maximum torque transfer, or in conjunction with anti-lock braking systems (ABS) based on traction control. Alternatively, the ABS traction control can be operated independently of the hydraulic coupling of the present invention. Thus, the present invention permits a wide range of torque transfer capability for maximum traction control.

Another advantage of the present invention is that the control valve provides the capability to operate the vehicle with large relative rotational speed differences between the axle half-shafts where desired thereby permitting use of mini-spare tires. In such circumstances, the limited slip differential capabilities are operated in a "system off" mode up to a limiting maximum speed.

Still another advantage of the hydraulic coupling of the present invention is that torque transfer across the axle half-shafts can be activated or deactivated at any time during vehicle operation without damage to differential components due, for example, to torque spikes that result in damage to gears or the clutch.

Still another advantage of the hydraulic coupling of the present invention is that it allows for proportional differential torque transfer in response to an input signal receiving various vehicle operational and drivetrain data such as axle half-shaft speed differences, shaft torque differences, as well as input regarding the relative pressures in the hydraulic circuit. Accordingly, the hydraulic coupling of the present invention includes a control circuit that facilitates this operation.

The hydraulic coupling of the present invention may be employed as a part of front or rear differentials, transfer cases or hydraulic couplings employing one or more hydraulic pumps and clutch systems without differential gearing that are used to control torque transfer between front and rear axles in all wheel drive vehicles.

BRIEF DESCRIPTION OF THE DRAWINGS

Other advantages of the invention will be readily appreciated as the same becomes better understood by reference to the following detailed description when considered in connection with the accompanying drawings, wherein:

FIGS. 2b and 2c are partial perspective views of the transfer port and associated valving illustrated in FIG. 2a;

DETAILED DESCRIPTION OF THE PREFERRED EMBODIMENT(S)

Figure 1:
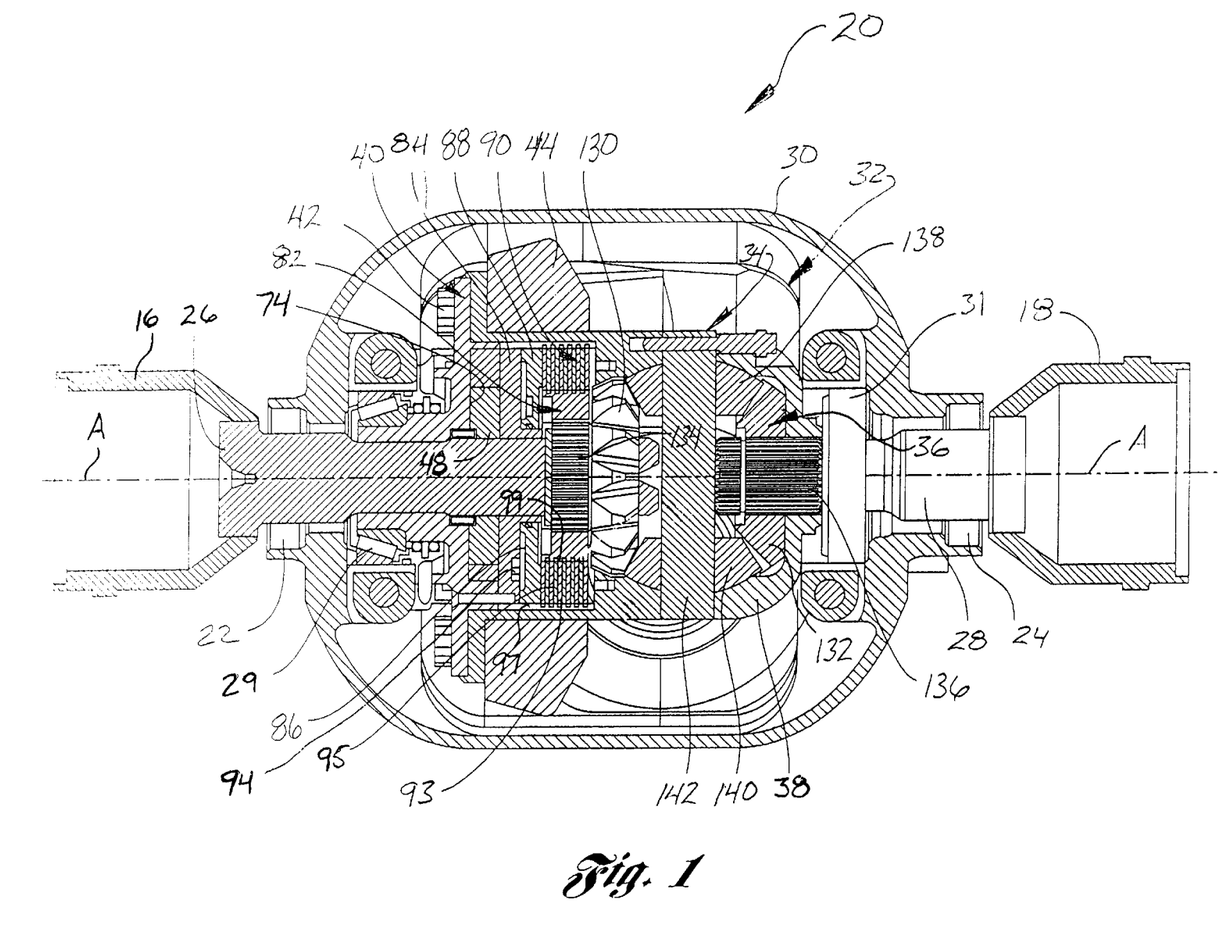
FIG. 1 is a cross-sectional side view of a hydraulic coupling of the type that may employ the control valve of the present invention.

Referring now to FIG. 1 where like numerals are used to indicate like structure throughout the figures, a differential is generally indicated at 20 and includes a hydraulic coupling generally indicated at 32. Those having ordinary skill in the art will appreciate that while the hydraulic coupling 32 is shown illustrated as a component of a differential 20, from the description that follows, it will be clear that the hydraulic coupling 32 may be employed in connection with a number of components of a vehicle drivetrain. However, in the embodiment illustrated in FIG. 1, the differential 20 is adapted to be rotatably driven from a power plant, such as a vehicle engine (not shown) and operates to drive a pair of axle half-shafts 26 and 28 that respectively embody a pair of rotary members which rotate about a rotational axis A. The axle half shafts 26, 28 are connected to separate traction wheels of a vehicle through universal joints represented at 16 and 18, respectively. The differential 20 includes a housing 30 which contains hydraulic fluid and has suitable unshown seals through which the axle half-shafts 26 and 28 project. The half-shafts 26, 28 are journalled on bearings 22, 24 in the housing 30. The hydraulic coupling 32 is supported within the housing 30 and operates to rotatably couple the axle half-shafts 26 and 28 as will be described in greater detail below.

The hydraulic coupling 32 includes a casing, generally indicated at 34 of hollow construction that is rotatable within the housing 30 via bearings 29, 31 about the rotational axis A. The casing 34 is connected to the rotary axle half-shafts 26 and 28 by a planetary gear set, generally indicated at 36. The planetary gear set 36 provides a differential action between the rotary members embodied by the axle half-shafts 26 and 28 until they are coupled together via the hydraulic coupling 32. As illustrated in this figure, the planetary gear set 36 is a differential gear set of the bevel type and will be described in greater detail below. The casing 34 includes a cup shaped member 38 and an end plate, generally indicated at 40, which each have peripheral flanges secured to each other by circumferentially spaced bolts 42. The bolts 42 also secure a bevel type ring gear 44 that is rotatably driven by a rotating drive member (not shown) which is ultimately driven by the engine.

The hydraulic coupling 32 of the present invention includes a hydraulic circuit that defines a low pressure portion wherein the hydraulic fluid is at a first, lower pressure and a high pressure portion wherein the hydraulic fluid is at a second, elevated pressure relative to the first pressure. To this end, the hydraulic coupling 32 also includes a hydraulic pump 48 that is operatively supported within the casing 34 and is located within the path of the hydraulic circuit between the low-pressure portion and the high pressure portion. The hydraulic pump 48 is operable to pump the hydraulic fluid from the low-pressure portion to the-high pressure portion of the hydraulic circuit as will be described in greater detail below.

Figure 9:
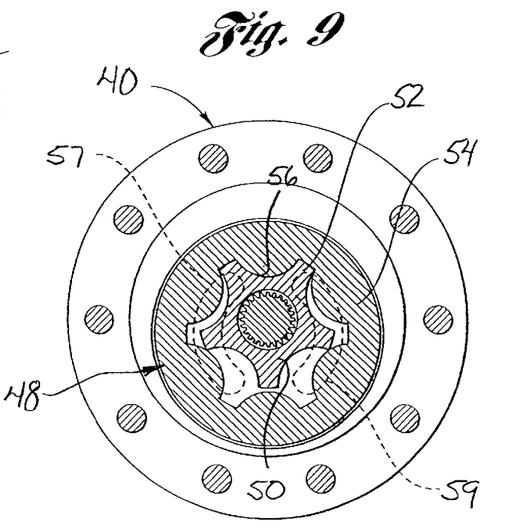
FIG. 9 is a cross-sectional side view in schematic form illustrating the elements of the hydraulic pump.

The hydraulic pump 48 may be of any suitable type and is preferably bi-directional in operation. However, in the preferred embodiment illustrated in these figures, the hydraulic pump 48 is of the geroter type. Thus, referring to FIGS. 1 and 9, the hydraulic pump 48 is supported within the casing 34 about the rotational axis A and includes a pumping component embodied by a toothed impeller 50 having external teeth 52. The hydraulic pump 48 also includes an outer pump element 54 mounted by the casing 34 for rotation eccentrically with respect to the toothed impeller 50. The outer pump element 54 includes internal teeth 56 having a number that is one more than the impeller teeth and which are in a meshing relationship with the impeller teeth to provide a pumping action upon relative rotation between the casing 34 and the toothed impeller 50. In the preferred embodiment illustrated in these figures, the impeller 50 has five teeth 52 and the internal ring gear 54 has six teeth 56. The number of teeth between the impeller 50 and ring gear 54 is a relationship that provides sufficient pumping capacity so that the hydraulic pump 48 can act effectively as a brake while still having relatively constant pumping pressure without fluid pulsation that would adversely affect the hydraulic coupling 32 provided between the axle half-shafts 26 and 28. However, those having ordinary skill in the art will appreciate that alternate relationships of the teeth may be employed depending upon the desired pumping capacity required for any given application. In any event, the relationship of the teeth defines high-pressure and low-pressure cavities, which, respectively, communicate with high-pressure and low-pressure ports 57, 59, illustrated in phantom in FIG. 9. If the hydraulic pump 48 is operated in one direction, one port 57 is a high-pressure port and the other port 59 is the low-pressure port. If the hydraulic pump 48 is operated in the opposite direction, the functions of the ports 57 and 59 are interchanged. Thus, the port 57 functions as a low-pressure port, and the port 59 will function as a high-pressure port.

Referring now to FIGS. 5 through 8, the end plate 40 of the casing 34 includes an annular hub 56 which defines an outer diameter 58 and a central passage 60 extending therethrough. One of the axle half-shafts 26 is rotatably supported through the central passage 60. The hydraulic coupling further includes a hydraulic slip ring, generally indicated at 62. The hydraulic slip ring 62 is fixedly supported within the housing 30 and about the outer diameter 58 of the hub 56. More specifically, the casing 34, including the end plate 40, is rotatably supported within the housing 30 while the hydraulic slip ring 62 is stationary. To this end, the slip ring 62 includes a pair of seal rings 64, 66 that surround the hub 56 and establish a running seal at the interface of the inner diameter of the rings 64 and 66 and the outer diameter 58 of the hub 56. Each of the rings 64 and 66 include flexible O-rings 68 and 70, respectively. The seal rings 64 and 66 and their associated O-rings 68, 70 are supported in annular seal openings formed in the hydraulic slip ring 62 opposite the outer diameter 58 of the hub 56.

The end plate 40 has an annular shoulder 72 that defines a pump cavity 74. The hydraulic pump 48 is supported within the cavity 74. The end plate 40 further includes a low-pressure inlet port 76 that provides fluid communication with the pump cavity 74. A check valve (schematically illustrated at 75 in FIG. 11) is operatively mounted within the inlet port 76 in a manner commonly known in the art. The hydraulic slip ring 62 includes a low-pressure pick up passage 78 that provides fluid communication between the low-pressure portion of the hydraulic circuit and the pump cavity 74. More specifically, the low pressure pick up passage 78 extends from a sump (schematically illustrated at 190 in FIG. 11) formed in the housing 30 to an annular cup-shaped inlet 79 defined by a flange 81 in the end plate 40 adjacent the inlet cavity 76. A low-pressure lip seal 83 (FIG. 5) surrounds the outer periphery of the flange 81 on the end plate 40. The low-pressure lip seal is received in and retained by a corresponding annular recess 85 formed on the hydraulic slip ring 62. Thus, the pick-up passage 78 provides fluid communication with the low-pressure inlet port 76 to the pump cavity 74. In this way, hydraulic fluid is delivered from the sump 190 at the first, lower pressure to the hydraulic pump 48. A screen 80 is employed to filter hydraulic fluid flowing from the sump to the slip ring 62.

The hydraulic coupling 32 further includes a clutch assembly, generally indicated at 82 in FIG. 1, that is operatively supported within the cup shaped member 38 of the casing 34 adjacent the end plate 40. An insert 84 is disposed between the hydraulic pump 48 and the clutch assembly 82. The insert 84 defines an annular piston chamber 86. A clutch actuating piston 88 is movably supported within the chamber 86 and is operable to engage and thereby actuate a clutch pack, generally indicated at 90. The clutch pack 90 includes alternating sets of clutch plates 93 and 95 with the one set of clutch plates 93 having outer peripheries that engage spline connections 97 to the casing 34. The other set of clutch plates 95 have central openings with spline connections 99 to the axle half-shaft 26. The shaft 26 also is splined to the pump impeller 50 on the opposite side of the insert 84 from the clutch assembly 82. When the clutch pack 90 is engaged, the casing 34 is coupled with the left axle half-shaft 26.

Figure 2A:
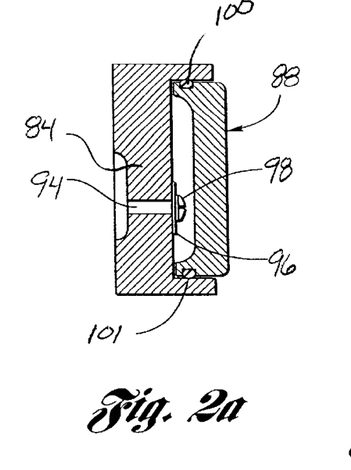
FIG. 2a is a cross-sectional view of the transfer port and associated valving employed in the hydraulic circuit and used to regulate the flow of hydraulic fluid from the hydraulic pump to the clutch.
Figure 2B:
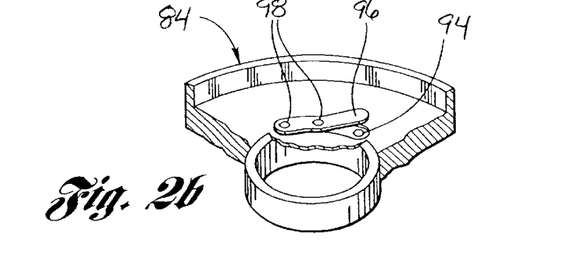
Figure 2C:
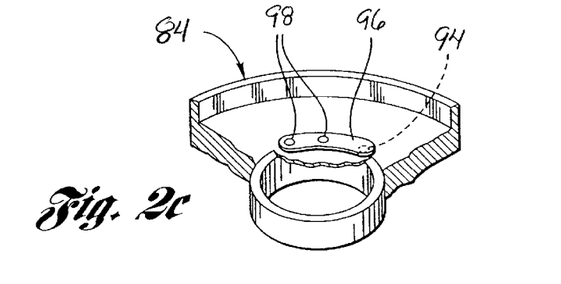

The insert 84 includes at least two transfer ports 94, only one of which is illustrated in FIG. 1. The transfer port 94 provides fluid communication between the hydraulic pump 48 and the piston chamber 86. However, as best illustrated in FIGS. 2a through 2c, a pressure inlet valve 96 is employed to control the flow of pressurized hydraulic fluid through the transfer ports 94. In the preferred embodiment illustrated in these figures, the valve 96 is a flexible, spring element that is secured to the insert 84 via fasteners, such as threaded screws or the like, as indicated at 98. The free end of the valve 96 registers with the transfer port 94 and assumes an open position or a closed position depending upon the fluid pressure in the transfer port 94. The outer, annular periphery of the piston 88 is provided with an O-ring seal 100. The inside diameter of the piston 88 is also sealed by an O-ring 101. When pressure develops in the transfer port 94, the valve 96 assumes the open position illustrated in FIG. 2b. When the pressure in the port 94 is reduced because of a reversal of the direction of rotation of the hydraulic pump 48 as described above, the valve 96 assumes the closed position illustrated in FIG. 2c.

More specifically, the hydraulic coupling 32 preferably has two valves which correspond to the valves shown in FIGS. 2a, 2b and 2c. One valve is located at each transfer port 94. When the positive displacement pump 48 is operated in one direction, transfer port 94 is pressurized, thereby opening the valve 96, as shown in FIG. 2b. If the differential gearing rotates in the opposite direction, thereby operating the pump 48 in the opposite direction, the transfer port 94 becomes a low-pressure port and the valve 96 assumes a closed position shown in FIG. 2c. When one of the transfer ports 94 is closed, the companion port for the opposite side of the hydraulic pump 48 is pressurized and therefore, becomes open. Upon a subsequent reversal in the direction of rotation of the hydraulic pump 48, the depressurized port 94 becomes pressurized and its companion port on the opposite side of the pump is depressurized.

Figure 3:
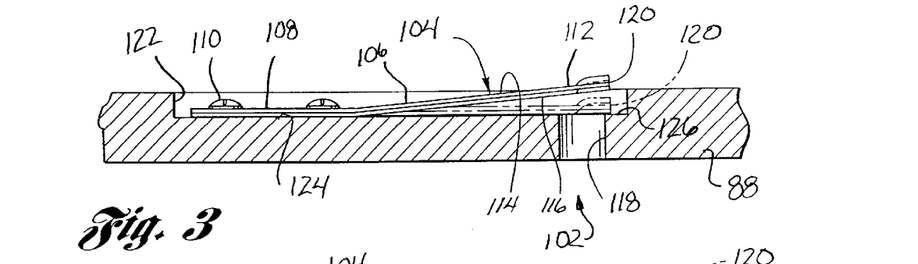
FIG. 3 is a cross-sectional view of an outlet port for the piston chamber of the clutch and that, as illustrated, is formed on the hydraulic piston of the clutch assembly.
Figure 4:
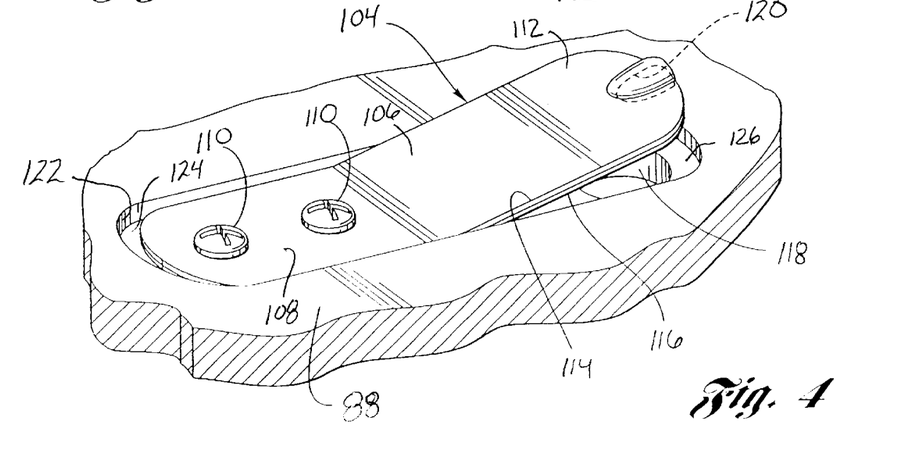
FIG. 4 is a partial perspective view of the outlet port illustrated in FIG. 3.
Figure 5:
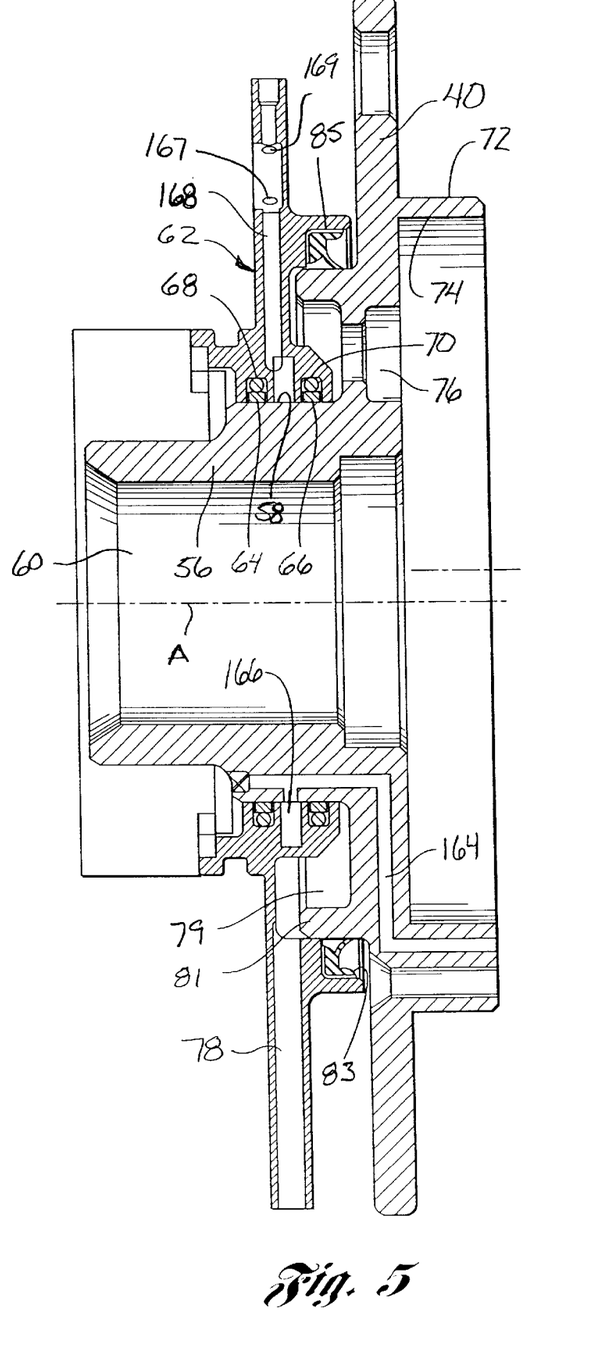
FIG. 5 is an enlarged cross-sectional side view of the end plate of the casing with the hydraulic slip ring supported thereon.
Figure 6:
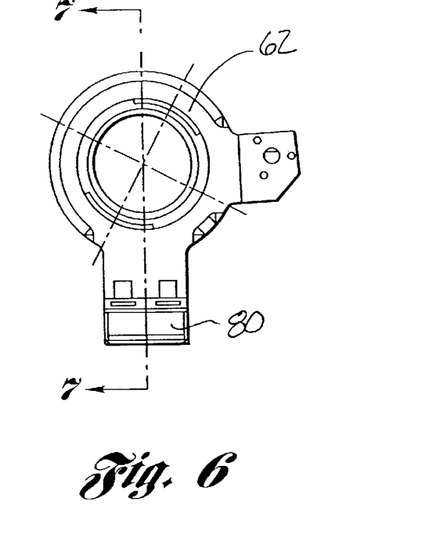
FIG. 6 is an end view of the hydraulic slip ring illustrated in FIG. 5.
Figure 7:
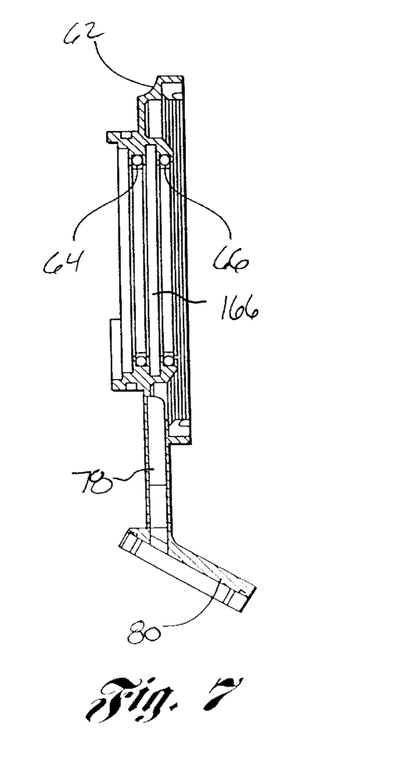
FIG. 7 is a cross-sectional side view of the hydraulic slip ring taken substantially along line 7—7 of FIG. 6.
Figure 8:
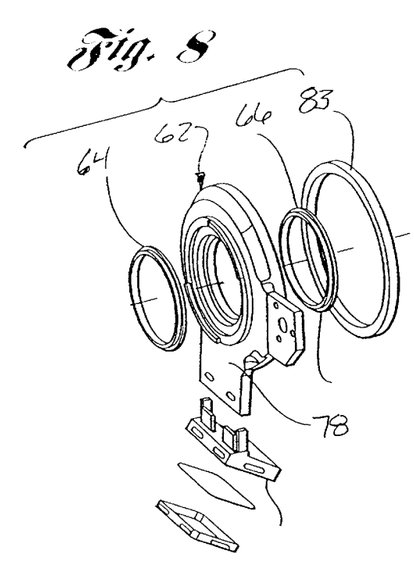
FIG. 8 is an exploded perspective view of the hydraulic slip ring.

Referring now to FIGS. 3 and 4, the annular piston chamber 86 is provided with a high-pressure outlet port, generally indicated at 102. In the preferred embodiment illustrated in FIGS. 1 and 3–4 the high pressure outlet port 102 is formed on the clutch actuating piston 88. A high-pressure outlet control valve 104 controls fluid flow through the outlet port 102. More specifically, the hydraulic fluid increases in pressure in response to increased relative rotation between the pump impeller 50 and the ring gear 54 and thus corresponds to the relative rotation between the left and right axle half-shafts 26 and 28. As the pumped hydraulic fluid reaches a predetermined pressure, the outlet valve 104 closes, as will be described in greater detail below, to close the outlet port 102 and thus prevent the hydraulic fluid from escaping from the piston chamber 86. This valve closing further increases the pressure of the pumped hydraulic fluid due to reduced flow through high-pressure outlet port 102. Furthermore, the fluid pressure causes the hydraulic pump 48 to act as a brake by coupling the impeller 50 with the outer pump element 54. Thus, when the fluid pressure in the piston chamber 86 has been increased to a predetermined level, the piston 88 actuates the clutch pack 90 while, at the same time, the hydraulic pump acts as a brake. In this way, the left and right axle half-shafts 26, 28 are coupled to each other through the casing 34 as the clutch assembly 82 locks out differential action that would normally be provided by the differential gear set 36.

The structure of the outlet valve may be of any suitable type that provides the automatic coupling of the axle half-shafts as a function of the pumped hydraulic fluid. Accordingly, those having ordinary skill in the art will recognize that the outlet valve may take may forms. However, the preferred embodiment of the outlet valve 104 is illustrated in FIGS. 3 and 4. There, the outlet valve 104 is shown as an elongated metallic strip valve element 106 having one portion or end 108 that is mounted in a spaced relationship to the outlet port 102 in any suitable manner, such as by the headed bolts 110 illustrated in these figures. The valve element 106 also has a distal end 112 that is movable between a solid line indicating an "open" position spaced from the outlet port 102 as shown in FIG. 3 and a phantom line indicating a "closed" position that closes the outlet port 102. More specifically, and as illustrated in these figures, the valve element 106 is of the bimetallic type and thus includes two metals 114 and 116 that have different coefficients of thermal expansion so as to cause the valve element to move as its temperature is raised and lowered.

As the hydraulic fluid is heated such as during continued use, the valve element end 112 moves toward the outlet port 102 with the net result being that the less viscous fluid will close the valve 104 at the same pressure of pumped fluid corresponding to the same amount of relative rotation between the axle half-shafts. Furthermore, upon cooling of the hydraulic fluid such as after rest for a certain period of time or when operated in cold weather, the valve element end 112 moves away from the outlet port 102 such that the valve closes at the same pressure of pumping of the more viscous hydraulic fluid. Thus, in addition to being responsive to the pressure of the hydraulic fluid, the bimetallic valve element 106 is temperature compensated as it adjusts to viscosity changes as the hydraulic fluid is heated and cooled to ensure that the coupling between the two rotary members (in this case the axle half-shafts 26 and 28) takes place at the same rate of relative rotation. Furthermore, the valve closing as discussed above causes the hydraulic pump 48 to also function as a brake that limits the relative rotation between the two rotary members embodied by the two axle half-shafts and also causes the actuation of the clutch 82 to further couple to two axle half-shafts to each other.

With continued reference to FIGS. 3 and 4, the outlet port 102 preferably includes a main passage 118 that is closed by the valve element 106 as its end 112 moves from the open position to the closed position as previously described. The outlet port 102 also includes a bleed passage 120 that remains open even when the valve element 106 is closed with respect to the main passage 118. Thus, the bleed passage 102 provides a bleed flow of hydraulic fluid that cools the clutch 82 and ensures that the pressure of the hydraulic fluid within the pump 48 does not excessively increase at an uncontrolled rate. While the bleed passage 120 may be formed in a number of ways, as illustrated in these figures, the distal end 112 of the elongated bimetallic strip valve element 106 defines the bleed passage 120 of the outlet port 102 while the valve body provided by the piston 88 defines the main passage 118 of the port 102. However, those having ordinary skill in the art will appreciate that the bleed passage may be formed in the valve body of the piston 88.

When the valve 104 opens, fluid flow through both passages of the outlet port 102 provides cleaning of the bleed passage 120 to remove any small particles that might block the smaller cross-sectional area of flow of the bleed passage. The control valve 104 is thus self-cleaning during normal usage. Also, the bleed passage 120 allows pressurized fluid to flow from the piston chamber 86 when the hydraulic pumping stops as the pair of rotary members cease to rotate relative to each other. The clutch 82 is disengaged as the pressure in the piston chamber 86 drops below a predetermined level.

With continued reference to FIGS. 3 and 4 an elongated mounting recess 122 may be formed on the piston 88. The mounting recess 122 includes one portion or end 124 at which the one end 108 of the valve element 106 is mounted and having another end 126 at which the main passage 118 and the bleed passage 120 of the outlet port 102 are located. This recess, in cooperation with the bimetallic valve element 106 provides a continually varying change in the cross-sectional flow area of flow to the outlet port 102 from the other side of the valve element such that movement of the valve element 106 in response to temperature changes provides an accurate control of the pressure at which the valve element closes to initiate the operation of the hydraulic pump 48 as a brake in the actuation of the clutch 82. For any given predetermined open position of the valve element 106, there is a certain pressure at which the hydraulic fluid of a certain velocity will cause closure of the valve element 106. This results from the flow of the hydraulic fluid between the valve element end 112 and the adjacent end of the recess 126 to the outlet port 102. This flow causes a pressure drop in the fluid as it flows past the valve element end 112 so that there is less force acting on the outlet side of the valve element end 112 than on the hydraulic pump side which is respectively the lower and upper sides as illustrated in FIG. 3. Movement of the valve element 106 to change the position of its end 112 in response to temperature changes varies the cross-sectional area of flow between this valve element end 112 and the recessed end 126 so as to thereby accurately compensate for temperature changes and ensure that the closure of the valve 104 corresponds to the same rate of relative rotation between the rotary members embodied by the axle half-shafts 26 and 28 shown in FIG. 1.

As noted above, the hydraulic coupling 32 illustrated in FIG. 1 further includes a bevel type planetary gear set 36 which acts to interconnect the casing 34 and one of the rotary members embodied by the right axle half-shaft 26. The planetary gear set 36 is located on the opposite side of the clutch assembly 82 from the hydraulic pump 48 and includes a pair of side gears 130 and 132 that have respective spline connections 134 and 136 to the rotary members embodied by the axle half-shafts 26 and 28. Planet gears 138 and 140 of the gear set 36 are each meshed with the pair of side gears 130 and 132 and are rotatably supported by a cross-pin 142 that extends through the rotational axis A between opposite sides of the casing 34. The planetary gear set 36 provides a differential action between the axle half-shafts 26 and 28 until the outlet valve 104 closes causing the hydraulic pump 48 to function as a brake and actuate the clutch assembly 82 as previously described. In this operative mode, the axle half-shaft 26 is coupled through the spline connections at 134, side gear 130, planet gears 138, 140, side gear 132 and the spline connections 136 with the other axle half-shaft 28.

The hydraulic coupling 32 having the outlet valve 104 is self-actuating in that it automatically acts to couple the rotary members 26, 28 where the differential action between them exceeds a predetermined amount. However, there is a need in the art for a hydraulic coupling that can be controlled independent of the fluid pressure generated by the hydraulic pump due to the differential action between the rotary members. The present invention provides a control valve that supplies this feature in the hydraulic coupling 32 as will be described in greater detail below. Furthermore, those having ordinary skill in the art will appreciate that the control valve as described below may be used in addition to the outlet valve 104 or in place of this valve.

Figure 10:
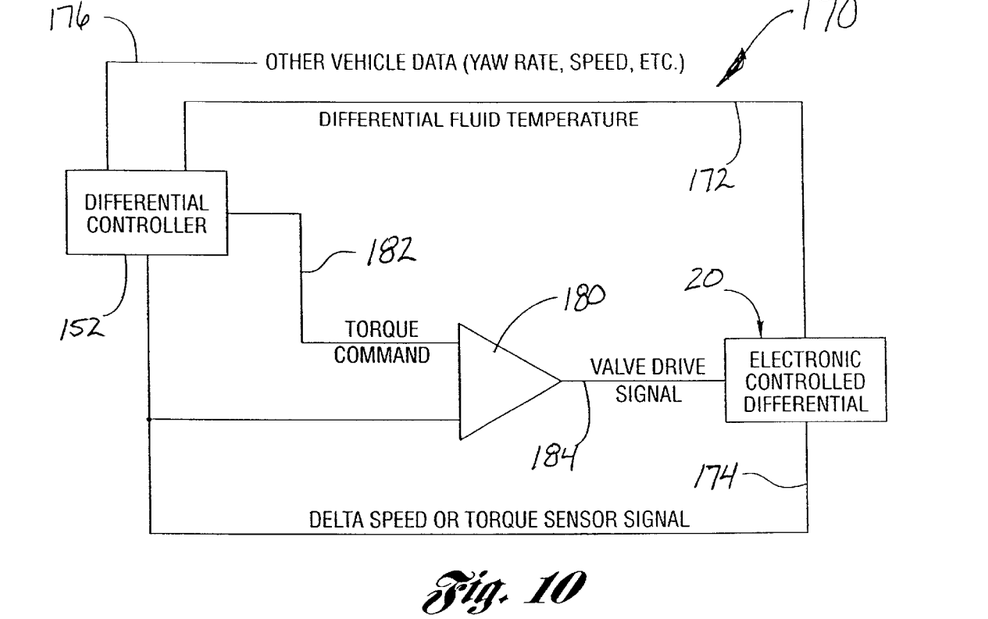
FIG. 10 is a functional electronic control flow diagram of the control circuit for the hydraulic coupling of the present invention.
Figure 11:
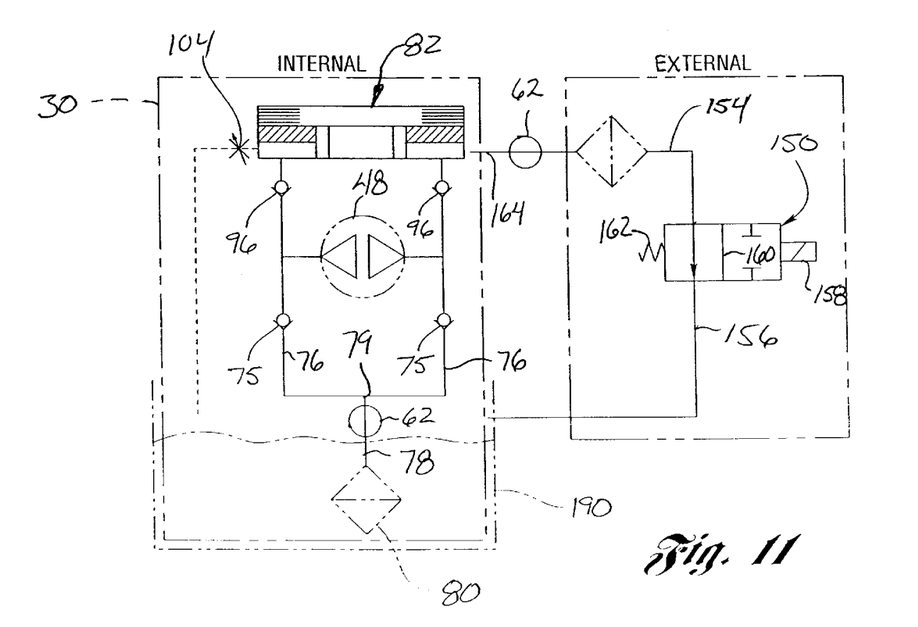
FIG. 11 is a schematic representation of the hydraulic coupling of the present invention and illustrating the hydraulic circuit thereof.

The hydraulic circuit for the hydraulic coupling 32 of the present invention is schematically illustrated in FIG. 11 where like numerals have been used to designate the schematically illustrated housing 30, bi-directional hydraulic pump 48, clutch assembly 82, low pressure inlet port check valves 75, pressure inlet valves 96, outlet valve 104 and the hydraulic slip ring 62. In addition, the hydraulic coupling 32 of the present invention includes a control valve 150 that is operable in response to a signal from a controller 152 (FIG. 10) to selectively control the actuation of the clutch assembly 82 independent of the fluid pressure that is generated in the high pressure portion of the hydraulic circuit due to actuation of the hydraulic pump 48. Thus, the control valve 150 is located within the hydraulic circuit and is adapted to selectively provide fluid communication between the high-pressure portion and the low-pressure portion of the hydraulic circuit such that the clutch 82 is bypassed and therefore deactivated. In the broadest terms, when it is open, the control valve 150 provides an open circuit through the hydraulic pump. The control valve 150 is supported outside of the casing 34. In this context, the control valve 150 may be supported on the inside surface of the housing 30 of the hydraulic coupling 32. However, as schematically illustrated in FIG. 11, the control valve 150 is supported external to the housing 30.

While the control valve 150 employed in the hydraulic coupling 32 of the present invention may be of numerous, different types, in the preferred embodiment contemplated by the inventors, the control valve 150 is an electronically actuated, hydraulic valve having an inlet port 154 which is in fluid communication with the high-pressure portion of the hydraulic circuit. The control valve 150 also includes an outlet port 156 that is in fluid communication with the low-pressure portion of the hydraulic circuit. To this end and as will be described in greater detail below, the control valve 150 communicates with the high-pressure portion of the hydraulic circuit through the hydraulic slip ring 62.

As shown in FIG. 11, the electronically actuated hydraulic control valve 150 may include a solenoid assembly, schematically illustrated at 158, a valve member, schematically illustrated at 160 and a return spring, schematically illustrated at 162. The solenoid assembly 158 is operable in response to an electronic signal from the controller 152 to actuate the valve member 160 thereby interrupting fluid communication between the high-pressure portion and the low-pressure portion of the hydraulic circuit. In this operative mode, fluid pressure is allowed to build in the piston chamber 86 that actuates the clutch assembly 82 via the piston 88 in the manner described above. On the other hand, the return spring 162 is operable to bias the valve member 160 to a position where in fluid communication is established between the high-pressure portion and the sump, schematically illustrated at 190 in the housing 30 of the hydraulic coupling.

As noted above, the hydraulic slip ring 62 provides fluid communication between the housing 30 and the control valve 150. To this end, the end plate 40 includes a high-pressure delivery passage 164 that is in fluid communication with the high pressure portion of the hydraulic circuit. (FIGS. 5 & 7) Specifically, the high-pressure delivery passage 164 is in fluid communication with the piston chamber 86 of the clutch assembly 82, on the one hand, and an annular shunt passage 166 formed on the hydraulic slip ring 62 between the seal rings 64, 66. The shunt passage 166 communicates with a radially extending control valve fluid delivery passage 168. The control valve fluid delivery passage 168 is in fluid communication with the inlet 154 to the control valve 150 via the ports 167, 169 formed adjacent the terminal end of the control valve fluid delivery passage 168.

The operation of the control valve 150 and therefore the coupling of the rotary members is controlled through a control circuit 170, illustrated in FIG. 10. The control circuit 170 include s the controller 152. The controller 152 is adapted to receive electronic input relating to the differential rotation of the rotary members 26, 28 with respect to each other as well as numerous other parameters. For example, the controller 152 may receive signals related to the differential fluid temperature through a signal flow path 172. Similarly, the hydraulic coupling may include sensors that sense the change in the rotational speed of the axle half-shafts or the torque acting through the axle half-shafts. Such signals may be transmitted through the signal flow path 174 to the differential controller 152. Still further, other vehicle data such as the yaw rate, speed, etc. may be communicated to the differential controller from other sensors via the signal flow path 176. The differential controller 152 stores the input data in a RAM memory portion of the microprocessor. An electronic central processor unit (CPU) addresses the registers where the data is stored and, using an algorithm stored in a ROM portion of the memory, will develop a signal corresponding to a torque command. The control circuit 170 further includes an error amplifier 180 that is adapted to receive the torque command signal from the differential controller 152 through the signal flow path 182. The electronically actuated hydraulic control valve 150 is adapted to receive a command drive signal from the error amplifier 180 through the signal flow path 184.

In this way, the control circuit 170 acts to control the actuation of the clutch assembly 82 via the control valve 150 independent of the pressure of the hydraulic fluid in the piston chamber 86 which forms a part of the high pressure portion of the hydraulic circuit. More specifically, if the signals received from the various sensors are balanced, equal or within an acceptable predetermined range, a torque command signal will not be issued from the controller 152. Thus, the command drive signal issued from the integrator will be zero and the solenoid assembly 158 of the control valve 150 will not be actuated. In this disposition, the valve member 160 is biased by the return spring 162 so that the control valve 150 is open and the relative pressures in the high pressure and low-pressure portion of the hydraulic circuit are equalized.

On the other hand, if the sensors indicate a sufficient difference in speed or torque for the axle half-shafts or any other predetermined signal exceeds a set amount, a torque command signal is issued from the controller 152 to the error amplifier 180. In turn, the error amplifier 180 provides a signal to the solenoid assembly 158 that moves the valve member 160 against the biasing force of the return spring 162 to close the control valve 150. When the control valve 150 is closed, and the hydraulic pump 48 has been actuated, sufficient pressure may be generated in the piston chamber 86 to actuate the clutch assembly 82 thereby coupling the axle half-shafts 26, 28 together.

Operation

With the above description in mind, it will be appreciated that when the axle half-shafts 26,28 are operating at the same speed with both tires on surfaces of equal traction, there will be no pumping action by the hydraulic pump 48. When a speed difference is created across the axle, the pump 48 operates in either one direction or the other. In this operative mode, there initially is a slight pressure in the piston chamber 86 as it fills and the outlet valve 104 closes so that the piston begins to move to compress the clutch pack 90. When the pressure buildup is complete, the pressure will rise in accordance with the flow rate, which is proportional to the amount of speed difference across the axle half-shafts and to the tuning of the outlet valve 104 itself. In this operative mode, the clutch assembly 86 will continue to create a torque bias until the torque transfer between the axle half-shafts 26, 28 and the speed difference across the axles is reduced. This will continue until the traction in both wheels becomes balanced.

The control circuit 170 including the control valve 150 permits an external signal to control actuation and deactuation of the clutch assembly 82 thereby overriding the self control feature of the hydraulic couplings known in the related art. When no signal is present and the differential begins to operate due to an axle speed difference, the clutch 82 cannot apply because fluid is routed from the piston chamber back to the sump 190 in the housing 30. In short, pressure of sufficient magnitude to apply the clutch assembly 82 and create a torque bias cannot be generated when the control valve 150 is in its open state, as illustrated, for example in FIG. 11. Thus, the limited slip characteristics of the hydraulic coupling of the present invention can be interrupted in this way at any time by removing the control signal from the control valve 150. This will open the valve 150 to discharge pressure from the high-pressure portion of the hydraulic circuit to the low-pressure portion.

The control circuit 170 illustrated in FIG. 10 can be closed by balancing an axle torque or delta speed generated by an input signal against a pressure signal from a transducer mounted in a differential hydraulic circuit. The control circuit 170 of the present invention permits an operator to choose the level of differential traction control by selecting either an open differential or a limited slip differential. In the alternative, the operator has the option of achieving a proportional traction control by modulating the torque transfer across the axle. The torque signal can be obtained by a direct reading torque sensor, or it may be a computed pressure signal based upon the driveline operating parameters. The computation can be done in known fashion by the microprocessor controller 152.

Accordingly, the hydraulic coupling having a control circuit and control valve of the present invention provides the operator with the ability to obtain torque bias on demand or, in the alternative, to obtain an automatic control mode. In this way, the external control valve 150 may function as a proportional pressure controller so that the magnitude of the torque bias developed can be tailored to a particular vehicle driveline characteristic. In addition, the control valve 150 may function solely between "on" and "off" modes.

The traction control feature can be tailored to meet predictable adverse traction circumstances. Thus, it is capable of being tailored to satisfy extreme off road driving conditions, extreme cold driving conditions or extended operations of a vehicle having differential axle half-shaft speeds such as when a vehicle is forced to use a mini-spare tire with a diameter that differs from the diameter of the tire of the companion traction wheel.

The hydraulic coupling of the present invention may be used in a differential that can be employed in conjunction with an antilock brake system (ABS) automatic traction control system. Thus, the present invention is compatible with such ABS systems and does not create any instability in the ABS traction control system when it is operated independently of or in conjunction with the torque bias feature of the differential.

The invention has been described in an illustrative manner. It is to be understood that the terminology that has been used is intended to be in the nature of words of description rather than of limitation. Many modifications and variations of the invention are possible in light of the above teachings. Therefore, within the scope of the appended claims, the invention may be practiced other than as specifically described.

We claim:

1. A hydraulic coupling for use in a vehicle drivetrain including a housing and a pair of rotary members projecting therefrom, said hydraulic coupling comprising:

a hydraulic circuit defining a low-pressure portion wherein the hydraulic fluid is at a first, lower pressure and a high-pressure portion wherein the hydraulic fluid is at a second, elevated pressure relative to said first pressure;

a hydraulic pump operatively supported within the housing and located within the path of the hydraulic circuit between said low pressure portion and said high pressure portion, said hydraulic pump operable to pump the hydraulic fluid from said low pressure portion to said high pressure portion of said hydraulic circuit;

a clutch supported within the housing and located within said high pressure portion of said hydraulic circuit, said clutch being actuable by hydraulic fluid pumped by said hydraulic pump and at said second, elevated pressure to couple the pair of rotary members together;

a control valve and a control circuit, said control circuit including a controller adapted to receive electronic input relating to the differential rotation of the rotary members with respect to each other, and an error amplifier adapted to receive a torque command signal from the controller; and said control valve adapted to receive a command drive signal from said error amplifier to selectively control the actuation of said clutch independent of the pressure of the hydraulic fluid in said high pressure portion of said hydraulic circuit.

2. A hydraulic coupling as set forth in claim 1 wherein said control valve is located within said hydraulic circuit and adapted to selectively provide fluid communication between said high-pressure portion and said low-pressure portion of said hydraulic circuit such that said clutch is deactivated.

3. A hydraulic coupling as set forth in claim 1 wherein said control valve is an electronically actuated, hydraulic valve having an inlet port in fluid communication with said high pressure portion of said hydraulic circuit and an outlet port in fluid communication with said low pressure portion of said hydraulic circuit.

4. A hydraulic coupling as set forth in claim 3 wherein said electronically actuated hydraulic valve includes a solenoid assembly, a valve member and a return spring, said solenoid assembly being operable in response to an electrical signal from a controller to actuate said valve member to interrupt fluid communication between said high pressure portion and said low pressure portion of said hydraulic circuit and said return spring being operable to bias said valve member to a position wherein fluid communication is established between said high pressure portion and said low pressure portion of said hydraulic circuit.

5. A hydraulic coupling as set forth in claim 1 wherein said assembly further includes a hydraulic slip ring providing fluid communication between the housing and said control valve.

6. A hydraulic coupling as set forth in claim 5 wherein said assembly includes a casing supported for rotation relative to said hydraulic slip ring within the housing, said hydraulic pump being supported within said casing, said low pressure portion of said hydraulic circuit including a sump defined within the housing.

7. A hydraulic coupling as set forth in claim 6 wherein said casing includes an end plate having a hub defining an outer diameter and a central passage extending therethrough, one of the pair of rotary members extending through said central passage, said hydraulic slip ring fixedly supported within the housing about said outer diameter of said hub.

8. A hydraulic coupling as set forth in claims 7 wherein said end plate includes an annular shoulder which defines a pump cavity, said hydraulic pump supported within said cavity, said end plate including a low pressure inlet port in fluid communication with said pump cavity, said hydraulic slip ring including a low pressure pick up passage in fluid communication with said low pressure portion of said hydraulic circuit and said low pressure inlet port to said pump cavity for delivering hydraulic fluid at said first, lower pressure to said hydraulic pump.

9. A hydraulic coupling as set forth in claim 8 wherein said end plate includes a high pressure delivery passage in fluid communication with said high pressure portion of said hydraulic circuit, said hydraulic slip seal including a control valve fluid delivery passage in fluid communication with an inlet to said control valve, said high pressure delivery passage in said end plate for providing fluid communication between said high pressure portion of said hydraulic circuit and said control valve.

10. A hydraulic coupling as set forth in claim 6 wherein said control valve is supported outside said casing of said hydraulic coupling.

* * * * *